May 16, 1961 P. W. TIMM ET AL 2,984,716
ELECTRIC SWITCHES
Filed Dec. 29, 1958 7 Sheets-Sheet 1

INVENTORS
PAUL W. TIMM
ROGER D. RULSEH
BY
*Arthur R. Woolfock*
ATTORNEY

May 16, 1961  P. W. TIMM ET AL  2,984,716
ELECTRIC SWITCHES

Filed Dec. 29, 1958  7 Sheets-Sheet 2

INVENTORS
PAUL W. TIMM
ROGER D. RULSEH

BY Andrew R. Woofolk
ATTORNEY

INVENTORS
PAUL W. TIMM
ROGER D. RULSEH
BY
Arthur R. Woolpert
ATTORNEY

May 16, 1961 P. W. TIMM ET AL 2,984,716
ELECTRIC SWITCHES
Filed Dec. 29, 1958 7 Sheets-Sheet 5

INVENTORS
PAUL W. TIMM
ROGER D. RULSEH
BY
*Arthur R. Woolfolk*
ATTORNEY

May 16, 1961

P. W. TIMM ET AL 2,984,716

ELECTRIC SWITCHES

Filed Dec. 29, 1958

INVENTORS
PAUL W. TIMM
ROGER D. RULSEH
BY

ATTORNEY

INVENTORS
PAUL W. TIMM
BY ROGER D. RULSEH

Arthur R. Woodyatt
ATTORNEY

United States Patent Office 2,984,716
Patented May 16, 1961

2,984,716
ELECTRIC SWITCHES
Paul W. Timm, Manitowoc, and Roger D. Rulseh, Two Rivers, Wis., assignors to Paragon Electric Company, Two Rivers, Wis.

Filed Dec. 29, 1958, Ser. No. 783,398
4 Claims. (Cl. 200—38)

This invention relates to electric switches.

Objects of this invention are to provide a novel form of electric switch which is so arranged that there is a power contact through which power is selectively supplied to two other contacts constituting a first circuit and a second circuit contact, and in which means are provided in the form of a cam construction driven by a synchronous motor so that at periodic intervals, for example, every 24 hours, a change is made in the contacts so that the power contact is placed in contact with the second circuit controlling contact and disconnected from the first circuit contact and in which continued motion of the cam means will restore the switch to its initial position with the power contact in engagement with the first circuit contact, and in which means are provided whereby the cam means itself is shifted so as to disconnect the power contact from the second circuit contact and restore it instantaneously to the first circuit contact.

The electric switch is capable of use in a great many installations and is not to be limited to any particular use. However, for the purpose of illustration, it can be very expeditiously used in connection with defrosting systems for a refrigerator. For example, the switch could be used in the defrosting system in which there is a power circuit and a compressor circuit normally connected, and in which the cam is arranged to disconnect the compressor or first circuit contact from the power contact and connect the power contact to the second circuit contact or heater contact and in which electromagnetic means are provided for instantaneously changing back from the heater contact to the compressor contact when the temperature within the refrigerator has arrived at a predetermined value and defrosting is therefore complete.

This arrangement described immediately above is shown in the copending application of Joseph J. Everard, Serial No. 613,186, for Control Means for Defrosting Refrigerators, filed October 1, 1956, now Patent No. 2,975,612 of March 21, 1961, and assigned to the same assignee as the present application. Although it is to be distinctly understood that the switches forming the subject matter of this invention are not confined or limited to such use. This could be used in many other types of installations, for example, a hot air defrosting system or other systems, or for electric signs or other systems of a type where a switch of this order would be useful.

Further objects are to provide a construction in which cam means are provided to initiate the switching operation from a power contact to a first circuit contact over to a second circuit contact for energizing the second circuit and disconnect the power supply from the first circuit and connect it to the second circuit, and in which electromagnetic means are provided for instantaneously transferring the contacts back to their initial position, as set forth hereinabove, by shifting the cam means itself, and in which, in one form, a single cam is employed and in another form two cams are employed one of which rotates much faster than the other so as to provide for a more sharply defined initiation of the switching operation.

Further objects are to provide a construction as set forth hereinabove in which electromagnetic means are employed and used only instantaneously to shift the cam means itself and to thereby re-establish the initial position of the contacts, and in which the electromagnetic means is so associated with the switch contacts that the electromagnetic means is instantly cut off after it has performed its function of shifting the cam means itself and effecting re-establishment of the contacts in their initial position.

Embodiments of the invention are shown in the accompanying drawings in which.

To simplify the description of the invention it is to be borne in mind that the switch construction is so arranged that a process, under the control of the switch, is time initiated and signal terminated. Stated in other words, the switch is designed to open a first circuit and close a second circuit at a predetermined selected time, and to close the said first circuit and open the said second circuit in response to a signal given over a third circuit.

This sequence of operations is well exemplified where the switch is used to control the defrosting of a refrigerator, in which the defrosting operation is time initiated and temperature terminated, and in which a heater or hot gas means is provided for quickly raising the temperature, the switch then stopping the heater or the hot gas means, or any other defrosting means, and instantaneously starting the compressor or other refrigerating means when the desired temperature has been reached.

Figure 1:
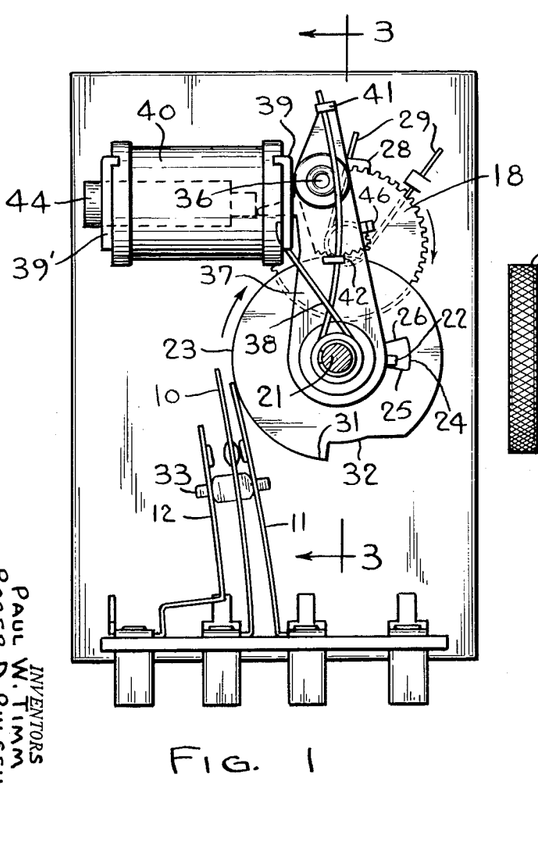
Figure 1 is a view looking directly into the switch construction, such view showing the device with the cover or casing removed.

Referring to Figure 1, the power supply contact or power contact is centrally located, and is indicated by the reference character 10. What may be called the first contact blade is indicated at 11, and will be referred to as the first blade or first contact or, in the case of a refrigerator, as the compressor contact or refrigerating means contact. The second contact blade or contact is indicated by the reference character 12 and in the case of a refrigerator, is connected to a defrosting heater or hot gas means and is referred to as the second blade or second contact or defrosting contact.

Figure 20:
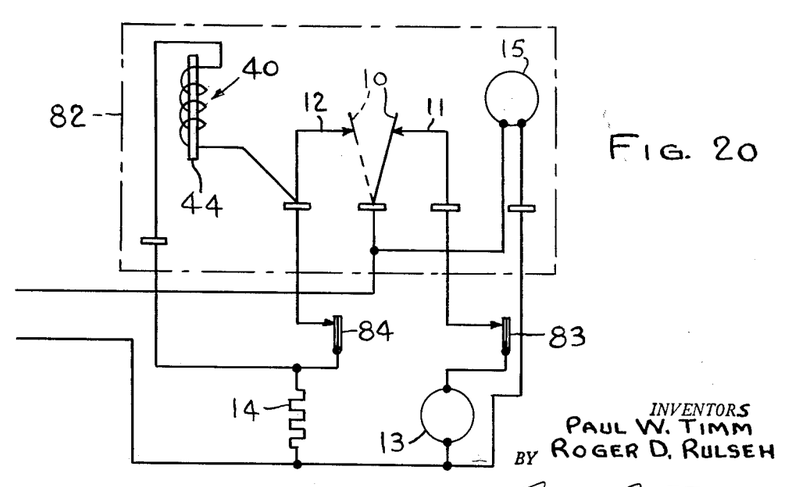
Figure 20 is a wiring diagram showing one arrangement in which the switch, of any of the forms, may be used, such view showing the switch construction as applied to a refrigerator.

The schematic diagram, Figure 20, or wiring diagram for an electric refrigerator, showing one application of the invention, shows a compressor, indicated by the reference character 13, and a heater by the reference character 14.

The continuously running synchronous motor which drives the cam as in the first form of the invention, or cams as in the second form of the invention hereinafter described, is indicated by the reference character 15.

The synchronous motor 15 drives the pinion 16 which may hereinafter be referred to as the driving pinion or driving gear, see Figures 2 and 4, through reduction mechanism indicated generally by the reference character 17, see Figure 2.

Figure 2:
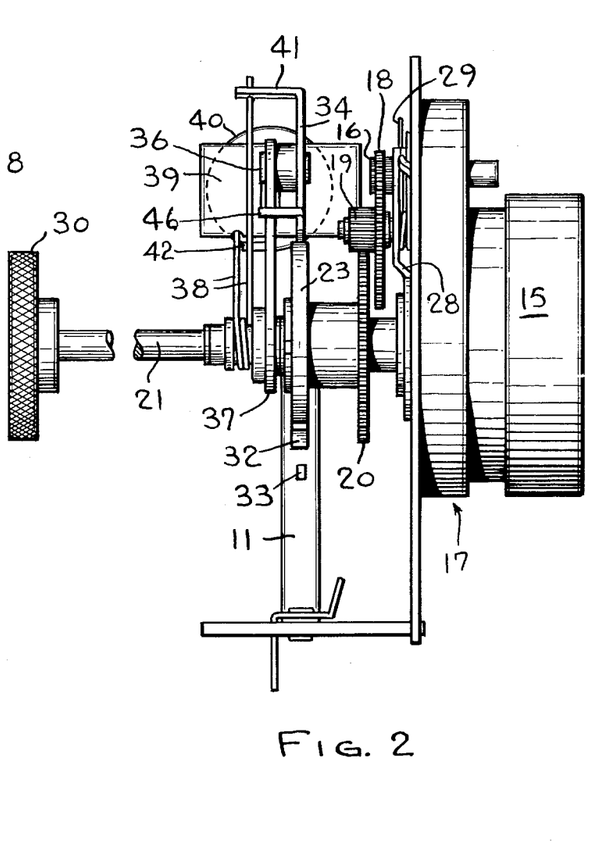
Figure 2 is a side elevation of the device shown in Figure 1.
Figure 3:
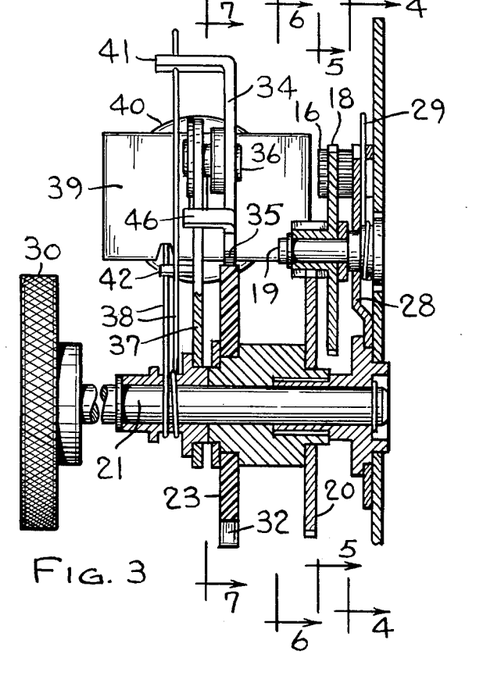
Figure 3 is a sectional view on the line 3—3 of Figure 1.
Figure 5:
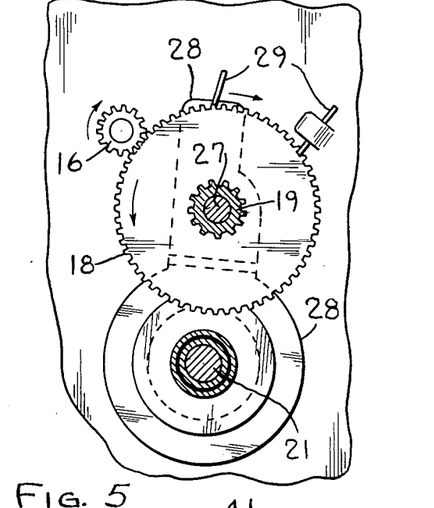
Figures 6, 7:
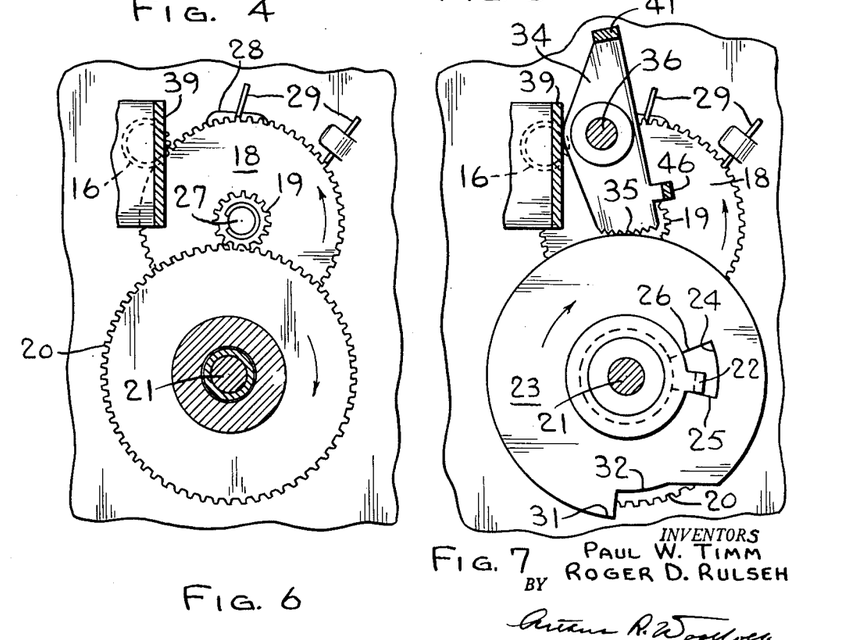

The driving pinion 16 occupies a fixed position so far as any lateral motion is concerned, and drives the relatively large gear 18, see Figures 2, 5, and 6. The relatively large gear 18 meshes with the driving gear 16 under normal conditions, and forms a unitary structure with a pinion 19 and through the pinion 19 drives the gear 20. The gear 20 is rigid with the twenty-four hour shaft or main shaft 21 which drives the driving finger 22 of lost motion mechanism, see Figures 1, 8 and 9, such lost motion mechanism being operatively positioned between the cam 23 and the driving pinion 16. The lost motion mechanism consists of the finger 22 and the notch portion 24 cut out of the cam 23 and provided with a front or leading face 25 and a rear or trailing face 26. The driving finger 22 normally contacts the leading face 25 of the lost motion mechanism described immediately hereinabove, so that the cam 23 is driven by the finger 22.

Figure 4:
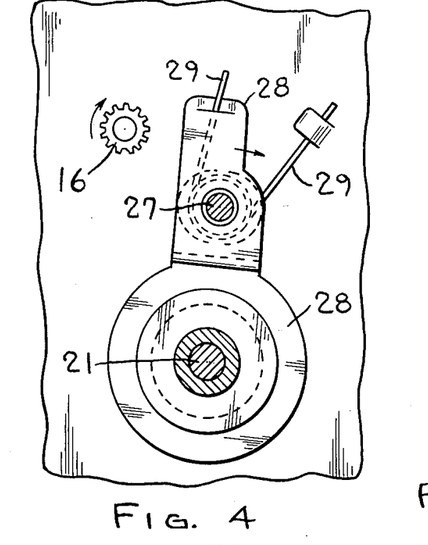
Figures 4, 5, 6, and 7, are sectional views taken on the lines 4—4, 5—5, 6—6 and 7—7, of Figure 3, respectively.

The gear 18 and the pinion 19 are revolubly mounted on a pin 27, see Figures 2 and 5, and the pin 27 is rigid with a swinging arm 28, see Figures 2, 4, and 5, which arm is pivoted around the main or twenty-four hour shaft 21. This arm 28 is urged toward the driving pinion 16 by means of the spring 29 and the mechanism described hereinabove constitutes a well known over-running clutch.

The over-running clutch allows the resetting of the timing finger 22 by means of the knob or hand-wheel 30, so that the timing cam 23 can be set wherever desired.

In reality, the setting of the twenty-four hour shaft 21 sets the position or determines the position of the driving finger 22 of the lost motion mechanism and through such lost motion mechanism, the setting of the cam 23.

Figure 9:
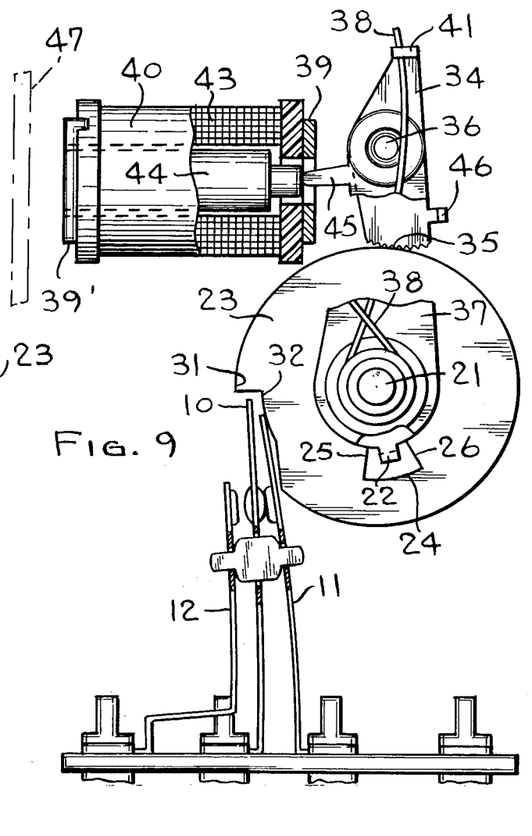
Figure 9 is a view corresponding to Figure 8 showing the switch returned to its initial position.

Normally the three contact blades 10, 11 and 12 are in the position shown in Figures 1 and 9, and the blades or contacts 10 and 11 are in engagement and the first circuit through the blades is closed, whereas the second circuit through the blades, 10 and 12 is open.

It is to be noted that the timing cam 23 is provided with a shoulder 31 and with a notch 32. It is apparent that as the cam 23 is rotated in a clockwise direction as viewed in Figures 1, and 8, the driving finger 22 will be in engagement with the front wall or face 25 of the lost motion mechanism, see Figures 1 and 8.

Figure 8:
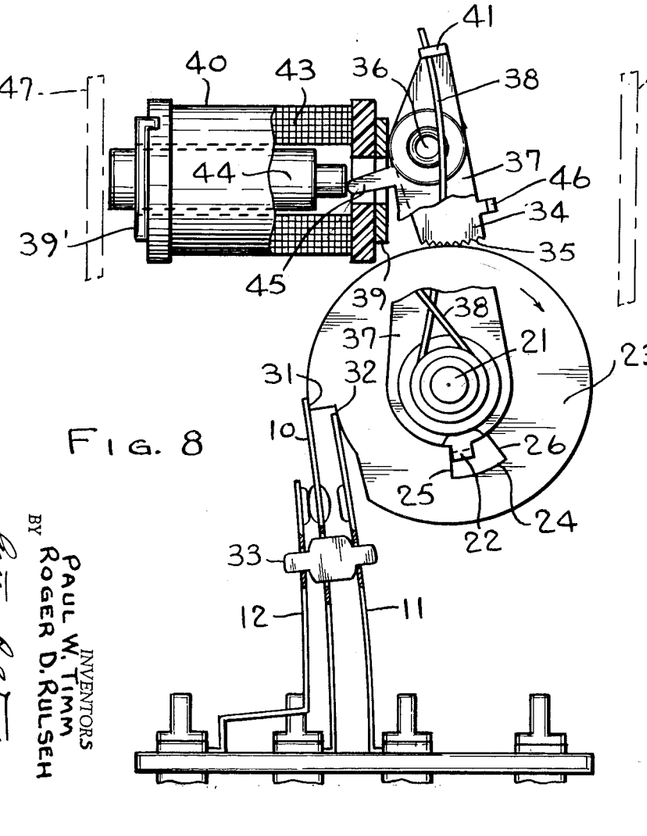
Figure 8 is a view, broken away and partly in section, showing the switch in its position just after the first switching operation has been initiated.

When the timing cam 23 arrives at the position shown in Figure 8 it is apparent that the first blade 11 will drop past the shoulder 31 and into the notch 32, whereas the power blade or center blade 10 will be held out of engagement with the blade or contact 11 of the first circuit, and in engagement with the blade or contact 12 of the second circuit. In other words, the first circuit will be open, and the second circuit closed.

It is to be noted that an insulating spacer 33 is provided and passes freely through the center blade 10 and is provided with shoulders normally in engagement with both blades 11 and 12, so that these blades move in unison. All of the blades 10, 11 and 12 are biased towards the right as shown in Figure 8.

It is apparent from the description thus far given that the first circuit will be opened and the second circuit closed by the timing cam 23 as shown in Figure 8. In order to release the blade 10 and open the second circuit and reclose the first circuit, means are provided for advancing the cam 23 without disturbing the driving finger or member 22.

Means for advancing the cam 23 and moving it from the position shown in Figure 8 to the position shown in Figure 9 constitutes an over-running clutch and is provided with an arm or pawl 34, see Figure 8, having a serrated or toothed bottom or inner end as indicated at 35. Normally this constitutes an over-running clutch. This over-running feature is accomplished due to the fact that the bottom or serrated portion 35 of the arm or pawl 34 is eccentric with reference to the pin 36 on which the arm 34 is pivoted so that as the timing cam 23 rotates in a clockwise direction it will freely ride or pass beneath the lower serrated face or portion 35 of the arm or pawl 34. The arm or pawl 34 is carried by an arm 37 pivoted about the main 24 hour shaft 21. The arm or pawl 34 is urged in a clockwise direction by means on one end of a spring 38, and tends to rock in a clockwise direction about the pin 36. The spring 38 bears at the bottom end against the face or portion 39 of an electromagnet 40, see Figure 1.

It is to be noted, however, that one arm of the spring 38 bears as stated against the projection 41 of the arm or pawl 34. It is to be noted also that an intermediate portion of the same arm of the spring 38 bears against a projection 42 formed on the arm 37, see Figures 1 and 2, which arm 37, it will be remembered, is pivoted so as to rock about the main or twenty-four hour shaft 21. Thus it will be seen that the spring 38 also urges the arm 37 in a counter-clockwise direction towards the electromagnet 40.

The electromagnet 40 is provided with an energizing winding 43. The rear or other magnetic pole of the electromagnet is indicated by the reference character 39'. The electromagnet is provided with a plunger 44, which is urged towards the right as viewed in Figures 1, 8 and 9 when the winding 43 is energized, or in other words, when the electromagnet is energized. This plunger or armature 44 is arranged to engage a finger 45 integral with the arm 37, and is thus arranged to rock the arm 37 in a clockwise direction as viewed in Figure 8, to the position shown in Figure 9. The clockwise direction of rotation of the arm 37 is transmitted through the pawl 34 to the timing cam 23, and moves the timing cam from the position shown in Figure 8 to the position shown in Figure 9, and thus allows or causes the center or power blade 10 to engage the first blade or first circuit contact 11 and to disengage itself from the second contact blade or contact 12 for the second circuit, see Figure 9.

The position of the arms or contacts 10, 11 and 12 when the contact or arm 11 has dropped in the notch 32 is shown in Figure 8, and the position of the contacts or arms 10, 11 and 12 when the timing cam 23 has been advanced a slight amount by the electromagnet to the releasing position is shown in Figure 9.

It will be seen that the lost motion mechanism with its leading face 25 of the timing cam has been moved in a clockwise direction away from the driving finger 22 of the constantly driven main shaft or twenty-four hour shaft 21.

It is to be noted from Figures 8 and 9 that the pawl 34 is provided with a projection 46 which limits the clockwise rotation of the pawl 34 in the event the pawl 34 becomes free from engagement with the timing cam 23 and should rotate too far in a clockwise direction from any unforeseen cause whatsoever.

It is to be noted that the casing 47, see Figures 8 and 9, limits the retracted or lefthand motion of the plunger 44 of the electromagnet 40. This casing is preferably of insulating material.

The second form of the invention is shown in Figures 10–17, and referring to such Figures 10–17, it is to be noted that there are two gears 48 and 49. The gear 49 is larger than the gear 48 and rotates at a slower speed than the gear 48. The lower speed gear 49 drives the lower speed cam 50, and the higher speed gear 48 drives the higher speed cam 51. These cams for the sake of clearness will be called the twenty-four hour cam 50, and the plural revolution cam 51. In other words, the cam 50 rotates once every twenty-four hours, and the cam 51 executes two or more complete revolutions for one revolution of the cam 50. The purpose of this will appear hereinbelow.

Figure 10:
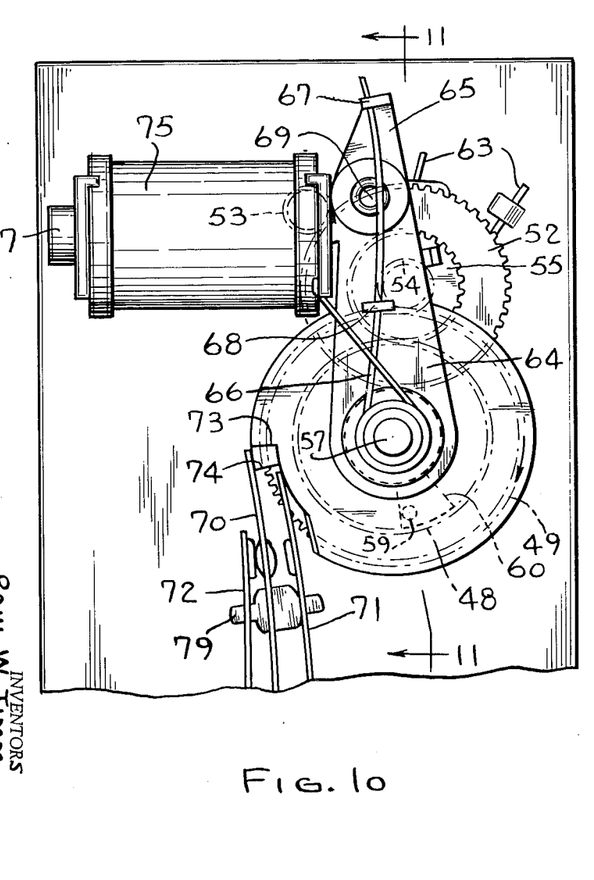
Figure 10 is an enlarged fragmentary view of the upper portion of the switch construction, showing a second form of the invention, such view being drawn to enlarged scale and corresponding to Figure 8.
Figure 11:
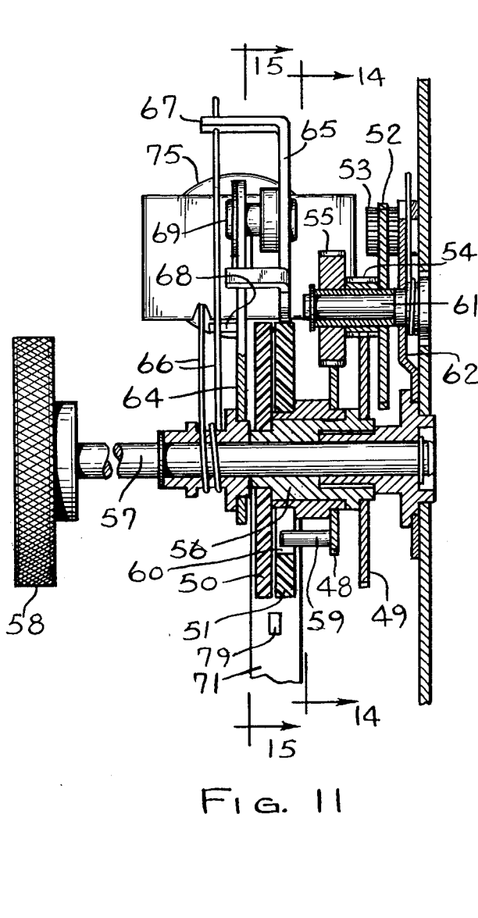
Figure 11 is a fragmentary sectional view on the line 11—11 of Figure 10.

In order to accomplish the above results the gear 52, which is driven from the motor pinion 53, Figures 10 and 11, is a unitary structure with a small pinion 54 and a larger pinion 55.

The hub 56 is rigidly mounted on the main shaft 57, and the main shaft carries the hand-wheel 58 by which it is set to the desired position with respect to time. The gear 48 is loose on the hub 56, and carries a driving-pin 59, which drives the multiple speed cam 51 through the lost motion mechanism formed by the pin 59 and the cutaway portion or notch 60. It will be seen therefore, that the gear 48 is driven at a higher speed than gear 49, and consequently, it will be seen that the cam 51 is driven at a higher speed than the cam 50. As a matter of fact, the cam 51 executes two, three, four, or a whole number of revolutions to one revolution of the cam 50.

It is to be noted that a pin 61 is mounted on a rocking lever 62. The rocking lever 62 together with a spring 63 constitutes the first or over-running clutch, similar to that previously described in the first form of the invention. The lever 62 is mounted so as to rotate concentrically with the main shaft 51. The arrangement is such that the lever 62 is urged to rock in a counter clockwise direction.

The pawl 65 is a part of what may be called the second over-running clutch. The pawl 65 is pivoted to rock about the pin 69 on a lever 64, and is spring urged to rock in a clockwise direction by means of the spring 66. The spring 66 engages a lug or finger 67 of the pawl 65. A second lug 68 on the lever 65 is also engaged by the spring 66. The spring 66 is so arranged that it urges the pawl 65 towards rotation in a clockwise direction, and urges the lever 65 in a counterclockwise direction.

Figure 12:
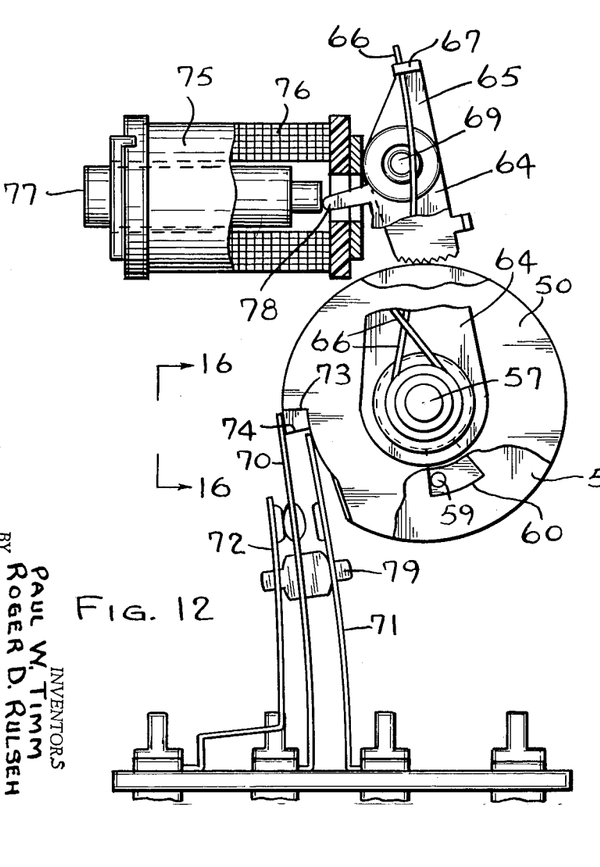
Figures 12 and 13 are views corresponding, respectively, to Figures 8 and 9 of the first form of the invention.
Figure 13:
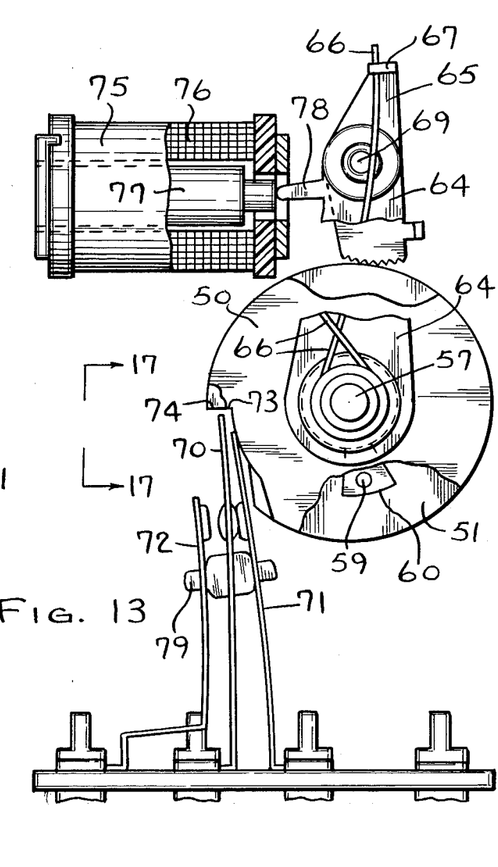
Figure 14:
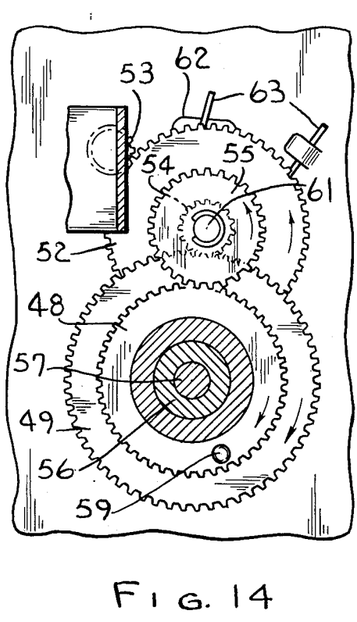
Figures 14 and 15 are fragmentary sectional views, partly in section, taken on the lines 14—14 and 15—15, respectively, of Figure 11.
Figure 15:
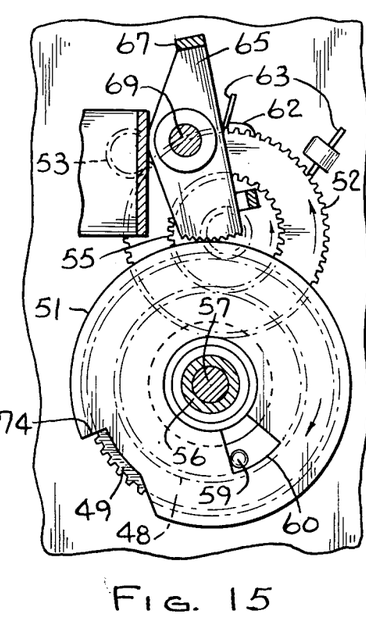
Figure 16:
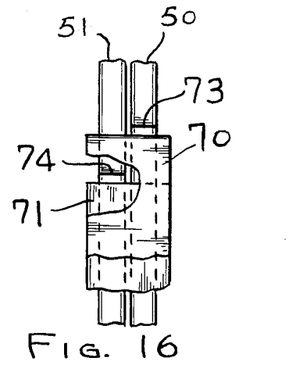
Figures 16 and 17 are enlarged, fragmentary, side elevations looking in the direction indicated by the arrows and lines 16—16 and 17—17 of Figures 12 and 13, respectively.
Figure 17:
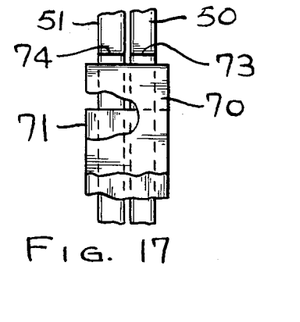

Referring to Figures 10, 12, and 13, it will be seen that an intermediate or power contact or spring arm 70 and a first circuit or first contact 71 bears against the outer face of the twenty-four hour cam 50 and the outer face of the plural revolution cam 51, see also Figures 16 and 17. The spring arm or contact 70 cooperates with the first contact or spring lever 71 and with a second contact or spring means 72.

Each of the cams is provided with a notched portion, for example the twenty-four hour cam is provided with a notch 73, and the plural revolution cam 51 is provided with a notch 74, see Figures 12 and 13. Just before these two notches are in complete registry, the spring arm 71 drops into the notches and the spring arm 70 rides for an instant on the plural speed cam as shown in Figure 10. When the higher speed cam 51 has its notch in complete registry with the notch in the twenty-four hour cam, the center contact or lever 70 drops into both notches as shown in Figure 13, and again engages the spring arm or contact 71 as shown in Figure 13.

The releasing mechanism is operated by the electromagnet 75, provided with an energizing winding 76. This electromagnet has a plunger 77, which moves to the right, as viewed in Figures 12 and 13, when the coil 76 is energized, and engages a finger 78 of the lever 64 and thus moves the plural speed cam in a clockwise direction as is obvious from Figures 12 and 13 and causes complete registry of the two notches in the two cams. The finger 71 moves simultaneously with the finger 72 because of the insulating spacer 79 exactly like that previously described.

The purpose of the construction hereinabove described is to provide a sharper time at which the center contact or spring arm 70 operates. For example, the slower speed cam first gets out of the way of the arm 71 as shown in Figures 10 and 12, and the higher speed cam subsequently releases the arm 70, that is to say, the higher speed cam or plural revolution cam determines very sharply the exact time or point at which the center arm 70 moves over to the right and engages the arm or contact 71. This is like that previously described so far as the spring arms or contacts are concerned. The difference is in the use of the two cams so as to obtain a sharper time initiation point.

Figure 18:
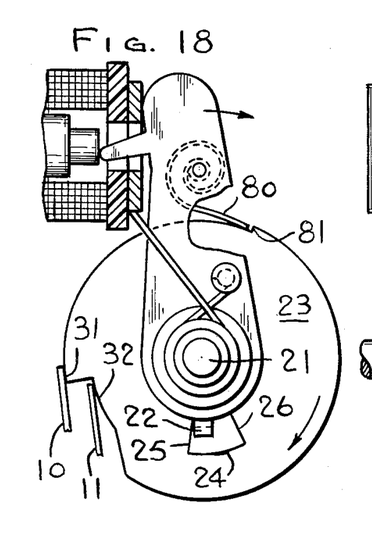
Figure 18 is a fragmentary view, partly in section, showing a third form that the invention may take.
Figure 19:
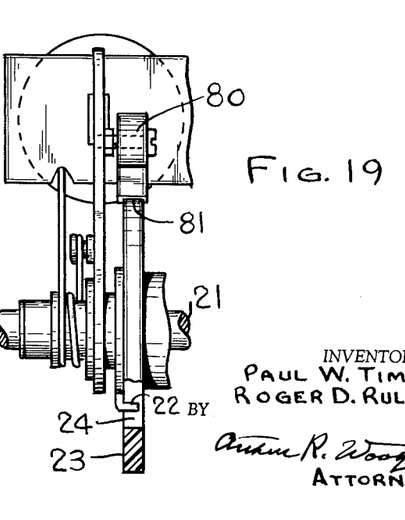
Figure 19 is a side elevation of the structure shown in Figure 18.

It is obvious that other forms of pawl and structure of this type could be employed. For example, as shown in Figures 18 and 19, it is possible to use a simple coil spring or flat spring 80, which engages a notch or shoulder 81 in the face of the cam 23. This structure is illustrated in Figures 16 and 17.

The same reference characters have been used in Figures 18 and 19 with the exception of the pawl 80 and notch 81 as that previously described in the first form of the invention.

Figure 20 shows a wiring diagram which is applicable to any of the forms of the invention although it has been shown primarily with reference to the first form.

The power arm 10 is shown in the position where it normally stays, that is to say, in the position where the compressor means 13 is connected to the power source through a low temperature thermostat in the usual way, so that when the temperature is low enough in the refrigerator 82 the low temperature thermostat indicated at 83 operates to stop the compressor or refrigerating means 13. On the other hand, when the cam holds the power contact or blade 10 in the position shown in Figure 8 the power contact 10 engages the contact 12 or second circuit contact and energizes the heater 14 or second circuit. The solenoid 40 would be energized in this second circuit, except for the fact that it is directly shorted by a high temperature thermostat 84. The heater 14 is thus energized and the solenoid 40 is maintained shorted by the high temperature thermostat 84. When the temperature within the refrigerator 82 reaches the desired high point to complete the defrosting, the high temperature thermostat 84 opens and at that instant the solenoid 40 will be energized and will advance the cam 23, see Figure 8, to the position shown in Figure 9, the lost motion mechanism allowing the motion of the cam without disturbing the position of the driving finger 22.

It will be seen therefore that the solenoid 40 is only instantaneously or momentarily energized and is then cut out because of the circuit of the power contact or power spring finger 10 which immediately moves from the position shown in dotted lines, Figure 20, to the full line position and thus cuts out the solenoid entirely and re-establishes the compressor or refrigerating first circuit. The operation of the switch is the same for all forms of the invention and is the same as that described in the co-pending application, Serial No. 613,186.

It will be seen that a novel timer has been provided in which no additional mechanism is required in the form of a tripping structure operated by a tripping or releasing mechanism. Instead, the cam means is moved directly from the tripping or releasing electromagnet plunger, thus greatly reducing the cost of construction and materially simplifying the construction and consequently reducing the time of manufacture and of assembly, and providing a device which is less liable to get out of order.

It will be seen further that the timer is very simple indeed, and may be freely employed to control, for example, the defrosting operation of an electric refrigerator, or to control any other operation desired. For example, it could control the sequence of operation or the duration of operation of electric signs and other devices.

Although this invention has been described in considerable detail, it is to be understood that such description is intended as illustrative rather than limiting, as the invention may be variously embodied and is to be interpreted as claimed.

We claim:

1. A timer switch comprising a cam, power means for continuously driving said cam at a uniform rate, lost motion mechanism between said power means and said cam for allowing motion of said cam without moving said power means, switch means comprising a first contact arm and a second contact arm, connecting means mechanically connecting said arms together, and a main contact arm between said first and second contact arms and biased towards engagement with said first contact arm and normally held out of engagement with said second contact arm by said cam, said cam having a notch to allow said first contact arm to move away from said main contact arm while said cam holds said main contact arm in contact with said second contact arm, and advancing means independent of said power means for advancing said cam to release said main contact arm and allow said main contact arm to move away from said second contact arm into engagement with said first contact arm, said lost motion means coacting with said advancing means and allowing said advancing means to operate without disturbing said driving means and said lost motion mechanism functioning solely to repeatedly and automatically allow said power contact arm to drop from said shoulder into said notch.

2. An automatic timing switch comprising a cam, power means for continuously driving said cam, lost motion mechanism between said power means and said cam for allowing said cam limited motion independent of said power means, a switch comprising a first contact means, a second contact means and a power contact means normally out of engagement with said second contact means and normally in engagement with said first contact means, said cam having a notch provided with a leading shoulder, said notch allowing said first and second contact means to move towards said cam while said shoulder holds said power contact means in engagement with said second contact means and out of engagement with said first contact means, and advancing means for advancing said cam a slight amount to allow said power contact means to drop from said shoulder into said notch and thereby move away from the second contact means and into engagement with said first contact means, said lost motion means coacting with said advancing means and allowing said advancing means to operate without disturbing said driving means and said lost motion mechanism functioning solely to repeatedly and automatically allow said power contact arm to drop from said shoulder into said notch.

3. A timer switch comprising a cam, driving means for driving said cam, power means for driving said driving means at a uniform rate, an overrunning clutch means between said driving means and said power means for allowing said driving means to be advanced to any desired position, a switch including a center contact means and a first contact means and a second contact means located on opposite sides of said center contact means, said first contact means and said second contact means being mechanically connected and being arranged to move in unison, said cam having a notch provided with a leading shoulder, said notch allowing said first and said second contact means to move inwardly toward said cam and said shoulder arranged to temporarily hold said center contact means out of contact with said first contact means and in contact with said second contact means, said center contact means being biased inwardly towards said cam, means for setting said driving means in an advanced position to any desired position, and automatically controlled means including an overrunning clutch means for advancing said cam to allow said shoulder to disengage said center contact means to thereby allow said center contact means to move into engagement with said first contact means and out of engagement with said second contact means.

4. A timer switch comprising a cam, power means for continuously driving said cam at a uniform rate, lost motion mechanism between said power means and said cam for allowing motion of said cam without moving said power means, switch means comprising a first contact arm and a second contact arm, connecting means mechanically connecting said arms together, and a main contact arm between said first and second contact arms and biased toward engagement with said first contact arm and normally held out of engagement with said second contact arm by said cam, said cam having a notch to allow said first contact arm to move away from said main contact arm while said cam holds said main contact arm in contact with said second contact arm, and advancing means independent of said power means for advancing said cam to release said main contact arm and allow said main contact arm to move away from said second contact arm into engagement with said first contact arm, said lost motion means coacting with said advancing means and allowing said advancing means to operate without disturbing said driving means and said lost motion mechanism functioning solely to repeatedly and automatically allow said power contact arm to drop from said shoulder into said notch.

References Cited in the file of this patent

UNITED STATES PATENTS

| | | |
|---|---|---|
| 1,831,605 | Porter | Nov. 10, 1931 |
| 2,254,661 | Markley et al. | Sept. 2, 1941 |
| 2,530,985 | Morrison | Nov. 21, 1950 |
| 2,536,256 | Berg | Jan. 2, 1951 |
| 2,553,846 | Clemens | May 22, 1951 |
| 2,675,442 | Van Ryan | Apr. 13, 1954 |
| 2,690,526 | Morrison | Sept. 28, 1954 |
| 2,736,173 | Duncan | Feb. 28, 1956 |
| 2,933,568 | Harada | Apr. 19, 1960 |